Aug. 19, 1941.  W. H. HAMILTON  2,253,271
MIXING MACHINE
Filed Feb. 16, 1940    2 Sheets-Sheet 1
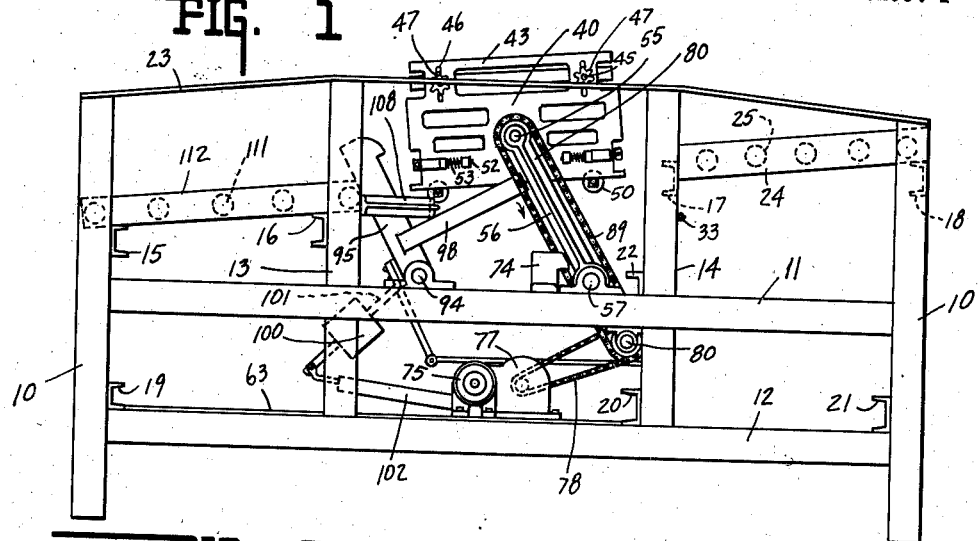
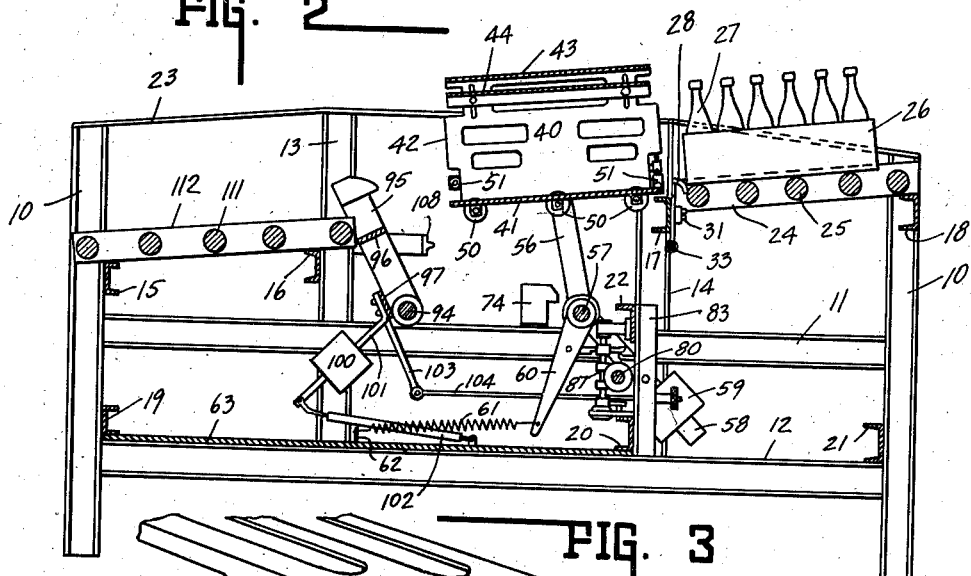
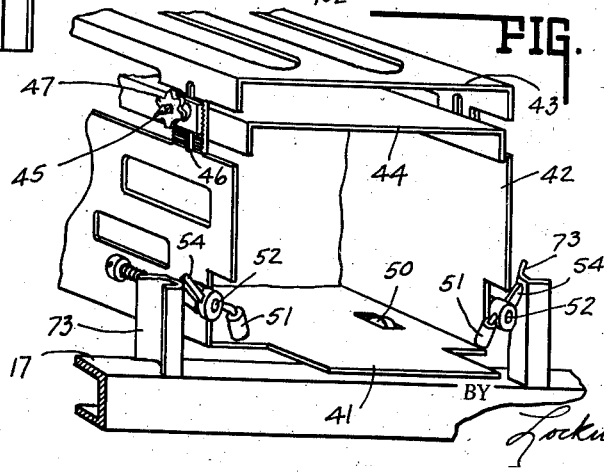
INVENTOR.
WALTER H. HAMILTON.
BY
Lockwood, Goldsmith & Galt.
ATTORNEYS.

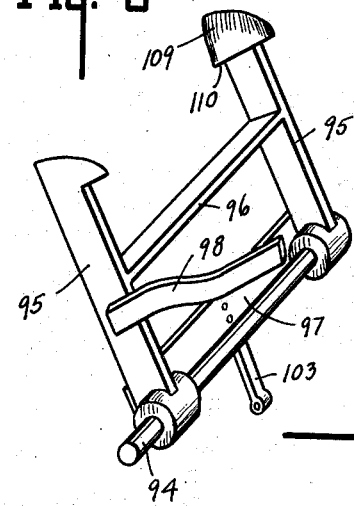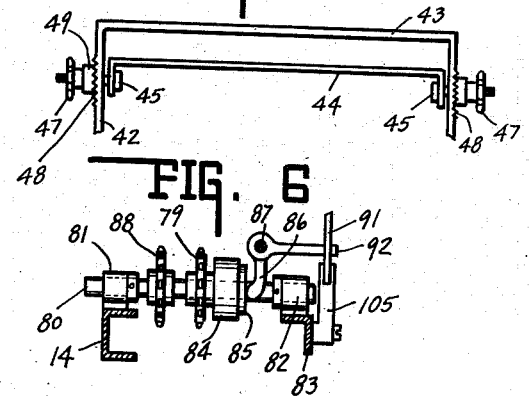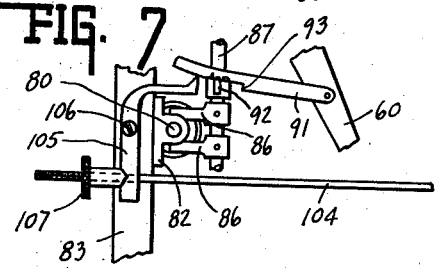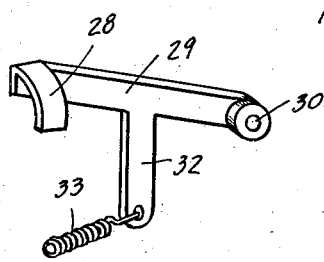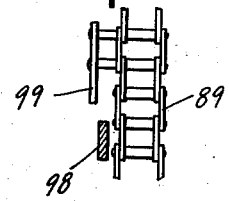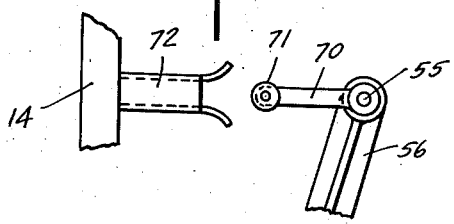

Patented Aug. 19, 1941

2,253,271

UNITED STATES PATENT OFFICE 2,253,271

MIXING MACHINE

Walter H. Hamilton, Fort Worth, Tex., assignor to Bottlers Equipment Company, Fort Worth, Tex., a corporation Application February 16, 1940, Serial No. 319,211

4 Claims. (Cl. 259—54)

This invention relates to a mixing machine particularly adapted for mixing bottle drinks and of the same general type of that disclosed in co-pending application of Curtis W. Gibbs, Serial No. 219,758, filed July 18, 1938, now Patent No. 2,190,421, issued February 13, 1934.

In this type of machine a case of bottled goods, usually containing twenty-four bottles, is placed in a rotatable container and is rotated for a pre-determined period of time to thoroughly mix the ingredients contained in the bottles.

One object of the present invention is generally to improve the efficiency of operation and to simplify the mechanism of machines of this type.

Another object of the invention is to improve and simplify the mechanism by means of which the movement of the cases into and out of the rotating container is controlled, and particularly to reduce the number of movements of said container necessary for a cycle of operation. In the co-pending application above mentioned the rotatable container is placed first at a receiving position in which it receives a case of goods. It is then moved to a mixing position at which the container is rotated. From there it is moved to a discharge position where the case is discharged after which the container returns to the receiving position to receive a new case. In the present invention, the discharge of the case takes place at the mixing position and the movement to and from a separate discharge position is omitted.

Another object of the invention is to provide a rotating container particularly adapted for adjustment for bottles of varying heights.

Other objects and features of the invention will be understood from the accompanying drawings and the following description and claims.

Fig. 1 is a side elevational view of a complete mixing machine constructed in accordance with the invention with the rotatable container positioned at the mixing and discharge position. Fig. 2 is a longitudinal sectional view of the same machine with the container located at the receiving position. Fig. 3 is a perspective end view of the container. Fig. 4 is a fragmentary elevational view of the end of the same. Fig. 5 is a perspective view of latch operating mechanism used for controlling the movement of cases from the container. Fig. 6 is a plan view of clutch control mechanism used for controlling the rotation of the container. Fig. 7 is an elevational view of the same. Fig. 8 is a perspective view of a member used for controlling the movement of cases to the container. Fig. 9 is an elevational view of a sprocket chain attachment and associated parts used for stopping the rotation of the container at the end of a rotational period. Fig. 10 is an elevational view of mechanism used for indexing the container at the case receiving station.

In the preferred form of the invention shown in the drawings by way of illustration, the stationary framework of the machine includes vertical corner posts 10, longitudinal side members 11 and 12 on each side of the machine, vertical side members 13 and 14 on each side of the machine, cross members 15, 16, 17, 18, 19, 20, 21 and 22 and upper longitudinal members 23. The parts just enumerated are preferably secured together by welding to form a rigid frame.

A receiving conveyor consisting of plates 24 having rollers 25 journaled thereon is supported on the frame members 17 and 18 and is adapted to receive a case 26 containing bottles 27. The cases may be placed on the conveyor manually or may be conducted thereto by any suitable conveying means. While resting on the rollers 25 waiting its turn to be mixed, the lower forward corner of a case engages a stop member 28, best seen in Fig. 8. Said stop member is mounted on an arm 29 having an opening 30 which receives a shoulder screw 31 by means of which the arm is pivotally mounted on the frame member 17. A downwardly extending arm 32 secured to the arm 29 has connected thereto a tension spring 33 secured at its opposite end to one of the frame members 14. Said spring normally holds the stop member 28 in an upraised position in which it holds the case on the rollers 25. The stop member 28 has an inclined upper surface so shaped that when the case 26 is manually pushed with sufficient force at the proper time in the cycle of operation, the stop member 28 is pressed downwardly and the case may enter the mixing container 40.

The mixing container 40 consists of a substantially rectangular open ended box having a floor plate 41, side plates 42 and a top plate 43. A false top 44 having a channel-shaped cross section is adjustably secured within the container by means of bolts 45 (Fig. 4) passing through slotted openings 46 in the side walls 42 and carrying threaded knobs 47 by means of which the false top may be clamped at any desired height above the bottom plate 41 of the container. To prevent undesired loosening of the connection, the outer walls of the side plates 42 are formed with teeth 48, best seen in Fig. 4. Blocks 49 having mating teeth thereon are interposed between the knobs 47 and the side walls 42. By means of this construction the false top 44 may be adjusted to the proper height to clear the tops of the bottles 27. The clearance however must be small since the false top must prevent unnecessary movement of the bottles in the cases during rotation of the container 40. The adjustment provides a ready means by which the machine may be promptly adapted to the mixing of products contained in bottles of various heights.

The floor plate 41 has mounted thereon a plurality of rollers 50 projecting upwardly through suitable openings in said plate and adapted to engage the bottoms of the cases to provide ready movement thereof into and out of the container.

For retaining the cases in the container during rotation thereof, there are provided latch members 51 at each end of the container. Each of said latch members is mounted on a stem 52 journaled on the side wall 42 of the container and is normally held by a torsion spring 53 in an upraised position to prevent movement of the cases for the container. A pin 54 is secured to each of the stems 52. A suitable upward pressure on said pins moves the latch members 51 downwardly to the position shown in Fig. 3, in which position said members permit movement of cases to or from the container 40.

The container 40 is provided with trunnions 55, one of which is secured to each side wall thereof. Said trunnions are journaled in the upper ends of arms 56 which are secured to a rock shaft 57 journaled in suitable bearings on the frame members 11. Said rock shaft has secured thereto an arm 58 carrying a counterweight 59. An arm 60 is also secured to the rock shaft 57 and has attached to the lower end thereof a tension spring 61 anchored to a pin 62 mounted on a deck plate 63 supported by the frame members 12. The spring 61 and counterweight 59 together are sufficient to more than counterbalance the weight of the empty container 40 but are not sufficient to counterbalance the weight of said container and a case of bottled goods contained therein.

When the container has been emptied, the counterweight and spring 61 move the same to the receiving position shown in Fig. 2. In this movement the container 40 is accurately aligned with the rollers 25 by means of an arm 70 (Fig. 10) mounted on the trunnions 55 at the far side of the machine, referring to Fig. 1. Said arm carries a roller 71 adapted to enter a channel-shaped guideway 72 mounted on one of the frame members 14. In so doing, it prevents rotation of the container 40 in its movement to the receiving position. In this movement the pins 54 at the receiving end of the container 40 engage cam members 73 mounted on the frame member 17 and are moved upwardly by said cam members to place the latch members 51 in position to permit the entrance of a case. When the case has been moved into the container the added weight thereof overbalances the counterweight 59 and spring 61 and the container moves by gravity to the mixing position shown in Fig. 1. This movement is limited by stop members 74 mounted on the frame members 11 and engaging the arms 56.

Power for rotating the container 40 is supplied by an electric motor 75 mounted on the deck plate 63. Said motor is connected to a reduction gear unit 77 and through said unit drives a sprocket chain 78 which is trained about a sprocket 79 running freely on a jack shaft 80 (Figs. 6 and 7). Said shaft is journaled on bearings 81 and 82 mounted respectively on one of the frame members 14 and on a vertical frame member 83 secured to the frame members 20 and 22. The sprocket 79 is secured to a freely moving portion of a clutch 84 which may be of a common commercial form adapted to connect the sprocket 79 for rotation with the jack shaft 80 when a splined portion 85 thereof is pressed to the left in Fig. 6 by clutch operating fingers 86 carried by a vertical rock shaft 87. The shaft 80 has secured thereto a sprocket 88 which is connected by a chain 89 to a suitable sprocket mounted on one of the trunnions 55 of the container 40. By means of this construction the motor 65 is connected to rotate the container 40 whenever the clutch fingers 86 are moved to press the clutch member 85 to the left in Fig. 6. Whenever said pressure is removed the clutch is disconnected and rotation of the container 40 may be stopped.

The clutch 84 is operated to start rotation of the container 40 by means of a latch bar 91 pivotally connected to the arm 60 and resting on a lever 92 secured to the vertical rock shaft 87. The latch bar 91 is provided with a shoulder 93 adapted to engage the lever 92 as the container 40 is moved by gravity to the mixing position. In so doing, said shoulder presses the lever 92 in the proper direction to engage the clutch fingers 86 with the clutch member 85. Thus the container 40 starts to rotate as soon as it has reached the mixing position of Fig. 1.

Mechanism for stopping the rotation of the container 40 and discharging the case therefrom is best seen in Figs. 5 and 9. Said mechanism includes a rock shaft 94 journaled in suitable bearings on the frame members 11 and having secured thereto a pair of upwardly extending arms 95 connected together as a rigid frame by cross members 96 and 97. A lever 98 is secured to one of the arms 95 and extends into the path of travel of an attachment 99 (Fig. 9) carried by the sprocket chain 89. A counterweight 100 carried by an arm 101 secured to the cross member 97 normally retains the parts just described in the position shown in Figs. 1 and 2. A shock absorber 102 is attached to one end of the arm 101 and is anchored at the other end to the deck plate 63. Said shock absorber is of the type commonly used for door checks and serves to cushion the movement of the parts in either direction. An arm 103 extends downwardly from the cross member 97 and has pivotally connected to the lower end thereof a link 104, the opposite end of which passes through a suitable opening in a lever 105 pivotally mounted by a shoulder screw 106 on the frame member 83. An adjusting nut 107 threadedly engages the outer end of the link 104 and serves to adjust the effective length of said link. The upper end of the lever 105 is shaped as best seen in Fig. 7 and is normally positioned beneath the latch bar 91.

In the operation of the parts just described, the attachment 99 strikes the lever 98 after a predetermined period of rotation of the container 40. In so doing, it moves said lever downwardly and rocks the arms 95 and the rock shaft 94 in a clockwise direction, referring to Figs. 1 and 2. This movement is limited by stop members 108 secured to the frame members 13. At the same time, the link 104 is drawn to the left in Fig. 2 (to the right in Fig. 7) and moves the lever 105 to lift the latch bar 91. This movement is sufficient to free the shoulder 93 from the lever 92 and to relieve the pressure of the clutch fingers 83 from the clutch. The motor is thus disconnected from the container 40 which continues to rotate under its own momentum until the forward edge thereof strikes the cross member 96 which is now in position beneath the path of travel thereof. The upper ends of the arms 95 are provided with inwardly and downwardly sloping cam faces 109 terminating in undercut latching shoulders 110. Said cam surfaces are now in position to engage the pins 54 of the latching units on the discharge end of the container 40 and to operate said units to withdraw the latch members 51 from the path of the case in the container. In this position the container 40 is properly inclined to permit the case to roll by gravity therefrom and to be received on a discharge conveyor consisting of rollers 111 mounted on plates 112 supported on the frame members 15 and 16. From this conveyor the cases may be discharged to any suitable form of conveying apparatus or they may be stopped thereon by suitable means and removed by hand.

The empty container 40 is now returned to the receiving position by counterweight 59 and spring 61. In this movement the sprocket chain 89 moves with the container and frees the attachment 99 from the lever 98 and permits the arms 95 and associated parts to return to normal position. The latch members 51 at the discharge end of the container are freed from the latching shoulders 110 and resume the proper position to stop an incoming case. The latch members 51 at the receiving end are withdrawn by the cam members 73 and a new cycle of operations may be started by pushing a new case into the container 40.

The foregoing specification describes the invention in one of its preferred forms, the details of which may be varied without departing from the scope of the invention as defined by the appended claims.

The invention claimed is:

1. In apparatus of the class described, a rotatable container adapted to receive a case of bottled goods, latching means carried by the container and normally holding a case in said container during rotation thereof, latch operating means movably mounted adjacent said container and movable into and out of the path of rotation of said latching means, power means for rotating said container, power transmission means connecting said power means and said container including an endless sprocket chain, an attachment carried by said sprocket chain, and means engageable by said attachment after a predetermined period of rotation of said container and adapted when so engaged to move said latch operating means into the path of rotation of said latching means, said latching means being operated by engagement with said latch operating means to release said case from said container.

2. In apparatus of the class described, a rotatable container adapted to receive a case of bottled goods, latching means carried by the container and normally holding a case in said container during rotation thereof, latch operating means movably mounted adjacent said container and movable into and out of the path of rotation of said latching means, power means for rotating said container, power transmission means connecting said power means and said container and including a clutch and an endless sprocket chain, an attachment carried by said sprocket chain, and means engageable by said attachment after a predetermined period of rotation of said container and adapted when so engaged to disconnect said clutch and to move said latch operating means into said path of rotation, said latching means being operated by engagement with said latch operating means to release said case from said container.

3. In apparatus of the class described, a rotatable container adapted to receive a case of bottled goods, a carrier on which said container is pivotally mounted, said carrier being movable to carry said container to and from a mixing position, latching means carried by the container and normally holding a case in said container during rotation thereof, latch operating means movably mounted adjacent said container and movable into and out of the path of rotation of said latching means, a motor, power transmission apparatus connecting said motor and said container to rotate the latter, and including a portion movable with said container to and from said mixing position, a device associated with said portion of said power transmission apparatus and movable thereby, actuating means engageable by said device after a predetermined period of movement thereof and adapted when so engaged to disconnect said motor from said container to stop said rotation and to move said latch operating means into said path of rotation, said latching means being operated by engagement with said latch operating means to release said case from said container, and means operating after discharge of said case to move said container from said mixing position and to clear said device from said actuating means.

4. In apparatus of the class described, a rotatable container adapted to receive a case of bottled goods, said container being open at both ends for the reception of a case at one end and the discharge thereof at the other, latching means at each end of the container for retaining a case therein, a carrier on which said container is pivotally mounted, said carrier being movable to carry said case from a receiving position to a mixing position and return, means for rotating said container on its pivotal mounting while at the mixing position, latch operating members engageable with the latching means at the receiving end of the container only when said container is at the receiving position and operating said latching means when so engaged to permit entrance of a case to said container, other latch operating members adjacent the mixing position and movable into and out of the path of rotation of the latching means at the discharge end of said container, and mechanism operable after a predetermined period of rotation to move said last mentioned latch operating members into said path of travel to engage and operate said latching members to release said case from said container.

WALTER H. HAMILTON.